United States Patent
Michihata et al.

(10) Patent No.: US 11,122,225 B2
(45) Date of Patent: Sep. 14, 2021

(54) MEDICAL IMAGE PROCESSING APPARATUS AND MEDICAL OBSERVATION SYSTEM

(71) Applicant: Sony Olympus Medical Solutions Inc., Tokyo (JP)

(72) Inventors: Taihei Michihata, Kanagawa (JP); Takahiro Yamamoto, Tokyo (JP)

(73) Assignee: SONY OLYMPUS MEDICAL SOLUTIONS INC., Tokyo (JP)

( * ) Notice: Subject to any disclaimer, the term of this patent is extended or adjusted under 35 U.S.C. 154(b) by 0 days.

(21) Appl. No.: 16/503,623

(22) Filed: Jul. 5, 2019

(65) Prior Publication Data

US 2020/0021762 A1     Jan. 16, 2020

(30) Foreign Application Priority Data

Jul. 13, 2018    (JP) .............................. JP2018-133375

(51) Int. Cl.
  *H04N 5/367*    (2011.01)
(52) U.S. Cl.
  CPC .............................. *H04N 5/3675* (2013.01)
(58) Field of Classification Search
  CPC .... H04N 5/2171; H04N 1/4097; H04N 5/367; H04N 5/3675; H04N 5/2176; H04N 5/2178
  USPC ................................................ 348/246–247
  See application file for complete search history.

(56) References Cited

U.S. PATENT DOCUMENTS

| | | | | |
|---|---|---|---|---|
| 2006/0028233 A1* | 2/2006 | Arazaki | ................. | H04N 5/367 324/760.01 |
| 2006/0044425 A1* | 3/2006 | Yeung | .................... | H04N 5/367 348/246 |
| 2011/0102624 A1* | 5/2011 | Hashizume | .......... | H04N 5/3675 348/222.1 |
| 2012/0154646 A1* | 6/2012 | Sai | ......................... | H04N 5/367 348/246 |
| 2013/0128082 A1* | 5/2013 | Kiyosawa | .............. | H04N 5/367 348/246 |

FOREIGN PATENT DOCUMENTS

JP    2001-211388 A    8/2001
JP    2015-134039 A    7/2015

* cited by examiner

*Primary Examiner* — Xi Wang
(74) *Attorney, Agent, or Firm* — Xsensus LLP

(57) ABSTRACT

A medical image processing apparatus includes: a defective pixel specifier configured to specify a defective pixel in a captured image based on a pixel level of each pixel in the captured image; a setting unit configured to set a correction degree of a defect correction process of making a brightness of the defective pixel approach a brightness of a discrimination area including surrounding pixels positioned around the defective pixel; and a defect corrector configured to perform the defect correction process according to the correction degree. When a difference between the brightness of the defective pixel and the brightness of the discrimination area is divided into a first range and a second range in which the difference is larger than that in the first range, the setting unit sets a higher correction degree for the difference is in the second range than the first range.

6 Claims, 6 Drawing Sheets

MEDICAL IMAGE PROCESSING APPARATUS AND MEDICAL OBSERVATION SYSTEM

CROSS-REFERENCE TO RELATED APPLICATION

The present application claims priority to and incorporates by reference the entire contents of Japanese Patent Application No. 2018-133375 filed in Japan on Jul. 13, 2018.

BACKGROUND

The present disclosure relates to a medical image processing apparatus and a medical observation system.

In a medical field, a medical observation system in which an image of a subject is captured by using an image sensor such as a charge coupled device (CCD) or the like and the captured image is displayed has been known (for example, see JP 2015-134039 A).

In the image sensor such as a CCD or the like, a defective pixel such as a white spot or the like is generated due to a physical defect of a semiconductor or the like in some cases. Such a defective pixel is a cause of degradation of image quality in the displayed captured image. Further, in the past, a technique of correcting (hereinafter, referred to as a defect correction process) such a defective pixel by an image processing has been suggested (for example, see JP 2001-211388 A).

In the technique described in JP 2001-211388 A, in a case where an exposure time of the image sensor exceeds a specific threshold value, the defect correction process is performed on the entire captured image. Meanwhile, in a case where the exposure time of the image sensor is equal to or less than the threshold value, the defect correction process is not performed on the entire captured image.

SUMMARY

In a case where pixel levels of surrounding pixels positioned around a defective pixel such as a white spot or the like in the captured image are high, the corresponding defective pixel such as a white spot or the like is inconspicuous. That is, it is not necessary to perform the defect correction process on the corresponding defective pixel such as a white spot or the like. Meanwhile, in a case where pixel levels of surrounding pixels positioned around a defective pixel such as a white spot or the like in the captured image are low, the corresponding defective pixel such as a white spot or the like is conspicuous. That is, it is necessary to perform the defect correction process on the corresponding defective pixel such as a white spot or the like.

As described above, it is possible to efficiently suppress image quality degradation of the corresponding captured image by controlling whether or not to perform the defect correction process on each region (each defective pixel) of the captured image.

However, in the technique described in JP 2001-211388 A, whether or not to perform the defect correction process on the entire captured image (all defective pixels included in the captured image) is controlled, and thus it is not possible to efficiently suppress image quality degradation of the corresponding captured image caused by the defective pixels, which is problematic.

According to one aspect of the present disclosure, a medical image processing apparatus includes: a defective pixel specifier configured to specify a defective pixel in a captured image obtained by capturing an image of a subject based on a pixel level of each pixel in the captured image; a setting unit configured to set a correction degree of a defect correction process of making a brightness of the defective pixel approach a brightness of a discrimination area including surrounding pixels positioned around the defective pixel in the captured image; and a defect corrector configured to perform the defect correction process according to the correction degree, wherein in a case where a range from a lower limit value to an upper limit value of a difference between the brightness of the defective pixel and the brightness of the discrimination area is divided into a first range and a second range in which the difference is larger than that in the first range, the setting unit sets a higher correction degree for a case where the difference is in the second range, in comparison to a case where the difference is in the first range.

DETAILED DESCRIPTION

Figure 1:
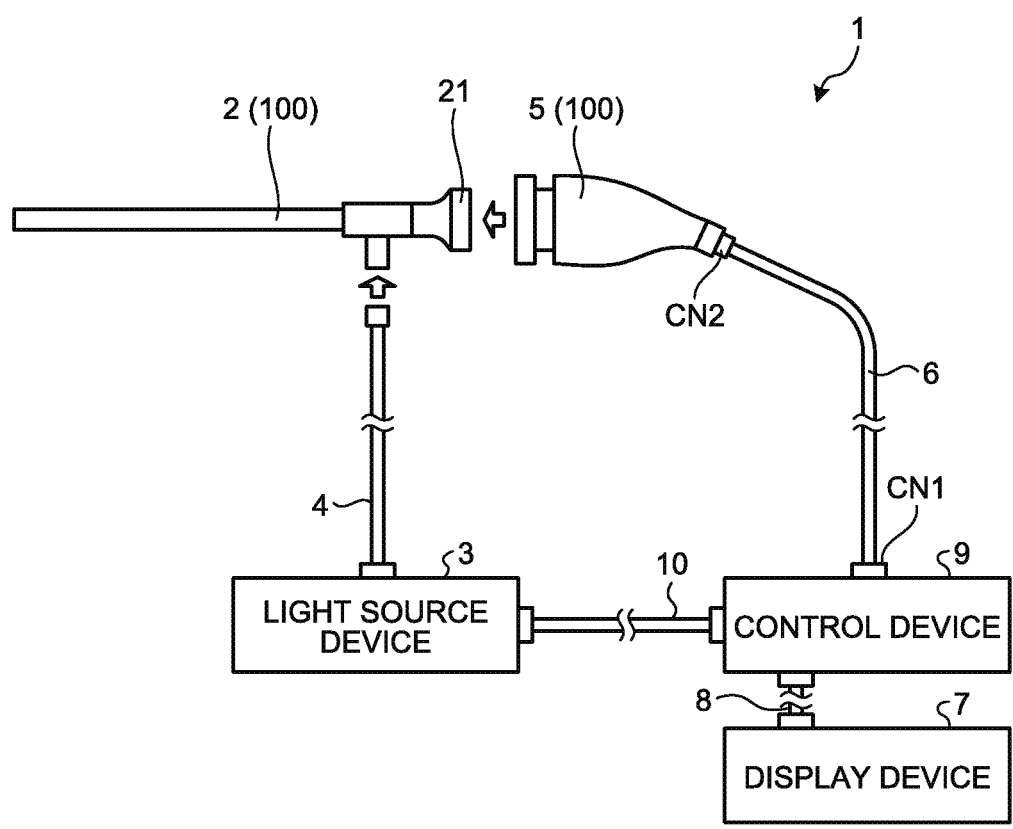
FIG. 1 is a diagram illustrating a configuration of a medical observation system according to an embodiment.

Hereinafter, an embodiment for implementing the present disclosure (hereinafter, referred to as the embodiment) will be described with reference to the drawings. It should be noted that the present disclosure is not limited to the embodiment to be described below. Further, the same component is denoted by the same reference numeral in a description with reference to the drawings.

Schematic Configuration of Medical Observation System

FIG. 1 is a diagram illustrating a configuration of a medical observation system 1.

The medical observation system 1 is an apparatus which is used in a medical field to observe the inside of a subject (the inside of a living body). As illustrated in FIG. 1, the medical observation system 1 includes an insertion unit 2, a light source device 3, a light guide 4, a camera head 5, a first transmission cable 6, a display device 7, a second transmission cable 8, a control device 9, and a third transmission cable 10.

In the present embodiment, the insertion unit 2 is implemented by a rigid endoscope. That is, the insertion unit 2 has an elongated shape which is entirely rigid or is partially flexible and partially rigid and is inserted into a living body. In the insertion unit 2, an optical system which is constituted by one lens or a plurality of lenses and collects an image of the subject is provided.

The light source device 3 is connected to one end of the light guide 4, and supplies light for lighting up the inside of the living body to one end of the corresponding light guide 4 according to a control by the control device 9. In the present embodiment, the light source device 3 is implemented separately from the control device 9. However, the present disclosure is not limited thereto and a configuration in which the light source device 3 is provided in the corresponding control device 9 may be adopted.

The light guide 4 has one end detachably connected to the light source device 3 and the other end detachably connected to the insertion unit 2. Further, the light guide 4 transfers light supplied from the light source device 3 from one end to the other end to supply the light to the insertion unit 2. The light supplied to the insertion unit 2 is emitted from a distal end of the corresponding insertion unit 2 and emitted to the inside of the living body. The light (subject image) emitted to the inside of the living body and reflected in the inside of the corresponding living body is collected by the optical system in the insertion unit 2.

The camera head 5 is detachably connected to a proximal end (an eyepiece 21 (FIG. 1)) of the insertion unit 2. Further, the camera head 5 captures the subject image collected by the insertion unit 2 and outputs an image signal (RAW signal) obtained by the corresponding capturing according to the control by the control device 9. The corresponding image signal is, for example, an image signal of 4K or more.

It should be noted that a detailed configuration of the camera head 5 will be described later.

The insertion unit 2 and the camera head 5 described above correspond to an observation apparatus 100 (FIG. 1).

The first transmission cable 6 has one end detachably connected to the control device 9 through a connector CN1 (FIG. 1) and the other end detachably connected to the camera head 5 through a connector CN2 (FIG. 1). Further, the first transmission cable 6 transmits the image signal or the like output from the camera head 5 to the control device 9, and transmits a control signal output from the control device 9, a synchronization signal, clock, power, and the like to the camera head 5.

It should be noted that in the transmission of the image signal and the like from the camera head 5 to the control device 9 through the first transmission cable 6, the corresponding image signal and the like may be transmitted in a form of an optical signal, or may be transmitted in a form of an electric signal. The same applies to the transmission of the control signal, the synchronization signal, and the clock from the control device 9 to the camera head 5 through the first transmission cable 6.

The display device 7 is implemented by a display using a liquid crystal, organic electro luminescence (EL), and the like, and displays an image based on a video signal from the control device 9 according to the control by the corresponding control device 9.

The second transmission cable 8 has one end detachably connected to the display device 7 and the other end detachably connected to the control device 9. Further, the second transmission cable 8 transmits the video signal processed by the control device 9 to the display device 7.

The control device 9 corresponds to a medical image processing apparatus. The control device 9 includes a central processing unit (CPU) and the like, and collectively controls operations of the light source device 3, the camera head 5, and the display device 7.

It should be noted that a detailed configuration of the control device 9 will be described later.

The third transmission cable 10 has one end detachably connected to the light source device 3 and the other end detachably connected to the control device 9. Further, the third transmission cable 10 transmits the control signal from the control device 9 to the light source device 3.

Configuration of Camera Head

Next, a configuration of the camera head 5 will be described.

Figure 2:
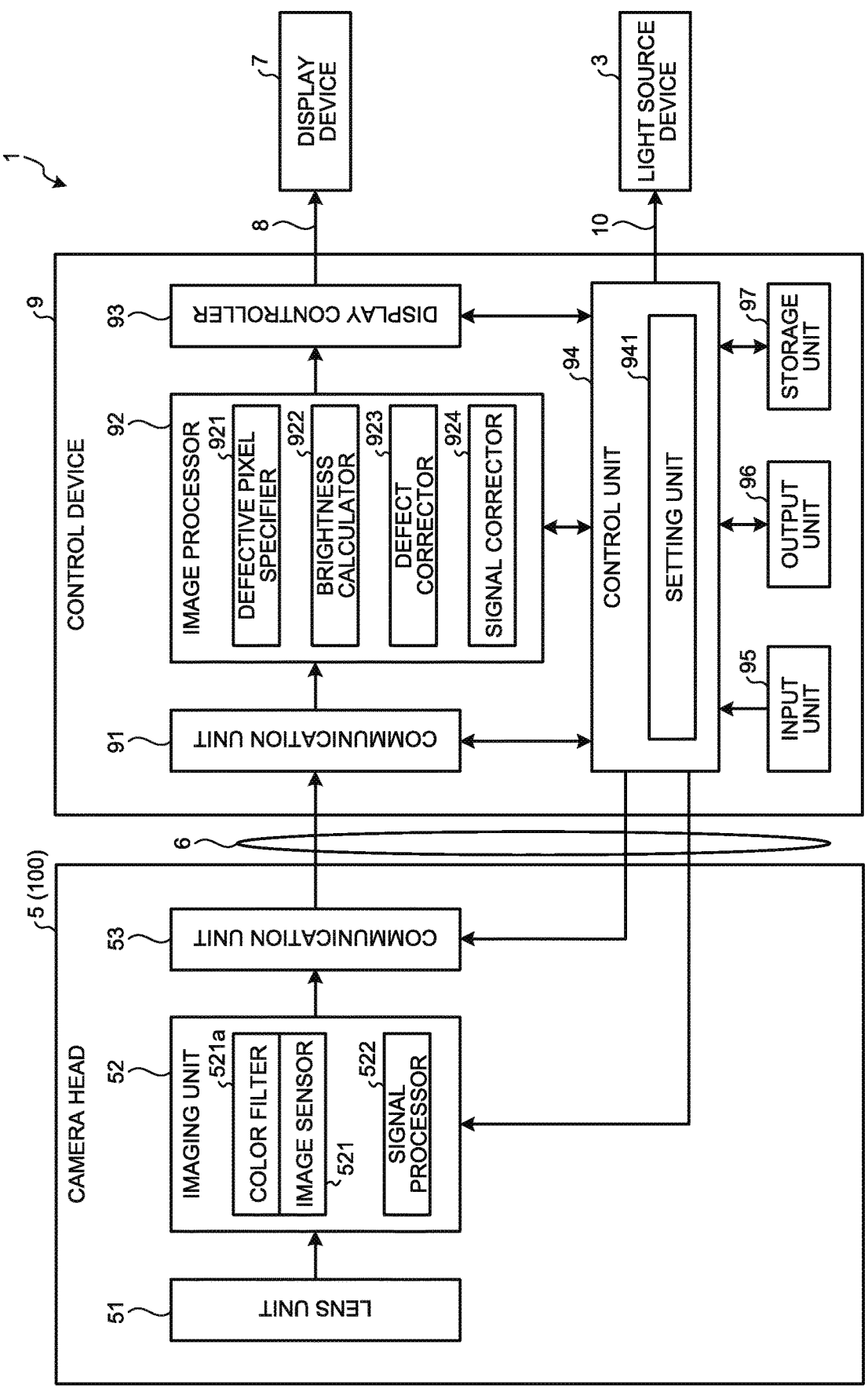
FIG. 2 is a block diagram illustrating a configuration of a camera head and a control device.

FIG. 2 is a block diagram illustrating a configuration of the camera head 5 and the control device 9.

For convenience of explanation, the connectors CN1 and CN2 between the control device 9 and the camera head 5, and the first transmission cable 6, connectors between the control device 9 and the display device 7, and the second transmission cable 8, and connectors between the control device 9 and the light source device 3, and the third transmission cable 10 are omitted in FIG. 2.

As illustrated in FIG. 2, the camera head 5 includes a lens unit 51, an imaging unit 52, and a communication unit 53.

The lens unit 51 is constituted by one lens or a plurality of lenses, and forms the subject image collected by the insertion unit 2 on an imaging surface of the imaging unit 52.

The imaging unit 52 captures an image of the inside of the living body according to the control by the control device 9. As illustrated in FIG. 2, the imaging unit 52 includes an image sensor 521 and a signal processor 522.

The image sensor 521 is implemented by a charge coupled device (CCD), a complementary metal oxide semiconductor (CMOS), or the like, which receives the subject image collected by the insertion unit 2 and formed by the lens unit 51 and converts the subject image into an electric signal (analog signal).

Here, a color filter 521a (FIG. 2) in which three filter groups, which are grouped according to wavelength bands of light (R (red), G (green), and B (blue)) to be transmitted, are arranged in a predetermined form (for example, a Bayer array) is provided in the imaging surface (light receiving surface) of the image sensor 521.

In detail, the color filter 521a includes an R filter group transmitting light in the wavelength band of R, a B filter group transmitting light in the wavelength band of B, a first G filter group (arranged in the same column as that of the R filter group) transmitting light in the wavelength band of G, and a second G filter group (arranged in the same column as that of the B filter group) transmitting light in the wavelength band of G. It should be noted that hereinafter, the first and second G filter groups will be collectively referred to as a G filter group for convenience of explanation.

That is, the electric signal (analog signal) from the image sensor 521 includes component information (pixel value) of any one of R, G, and B corresponding to the respective R, G, and B filter groups, for each pixel.

The signal processor 522 performs a signal processing on the electric signal (analog signal) from the image sensor 521 to output an image signal (RAW signal (digital signal)).

For example, the signal processor 522 performs, on the electric signal (analog signal) from an image sensor 541, a processing of canceling reset noise, a processing of multiplying an analog gain amplifying the corresponding analog signal, and a signal processing such as A/D conversion or the like.

The communication unit 53 functions as a transmitter transmitting the image signal (RAW signal (digital signal)) output from the imaging unit 52 to the control device 9 through the first transmission cable 6. The communication unit 53 is implemented by, for example, a high-speed serial interface performing, with the control device 9 through the first transmission cable 6, communication of the image signal at a transmission rate of 1 Gbps or more.

Configuration of Control Device

Next, a configuration of the control device 9 will be described with reference to FIG. 2.

As illustrated in FIG. 2, the control device 9 includes a communication unit 91, an image processor 92, a display controller 93, a control unit 94, an input unit 95, an output unit 96, and a storage unit 97.

The communication unit 91 functions as a receiver receiving the image signal (RAW signal (digital signal)) output from the camera head 5 (communication unit 53) through the first transmission cable 6. The communication unit 91 is implemented by, for example, a high-speed serial interface performing, with the communication unit 53, communication of the image signal at a transmission rate of 1 Gbps or more.

The image processor 92 processes the image signal (RAW signal (digital signal)) output from the camera head 5 (communication unit 53) and received by the communication unit 91 according to a control by the control unit 94. As illustrated in FIG. 2, the image processor 92 includes a defective pixel specifier 921, a brightness calculator 922, a defect corrector 923, and a signal corrector 924.

The defective pixel specifier 921 performs a defective pixel specifying process of specifying a defective pixel consisting of a defective white spot pixel in the image signal (hereinafter, referred to as a captured image CI (see FIG. 3)) output from the camera head 5 and received by the communication unit 91. Here, when performing the corresponding defective pixel specifying process, the defective pixel specifier 921 specifies a pixel of which a corresponding pixel level exceeds a specific threshold value as a defective pixel by referring to a pixel level of each pixel in the captured image CI. As the corresponding pixel level, component information (pixel value) of any one of R, G, and B corresponding to the respective R, G, and B filter groups which constitute a color filter 541a may be exemplified in a case where the captured image CI is an image (see FIG. 3) before a demosaicing process performed by the signal corrector 924. Further, as the corresponding pixel level, a luminance value according to an RGB value (pixel value) or a Y signal (luminance signal) may be exemplified in a case where the captured image CI is an image (not illustrated) after the demosaicing process performed by the signal corrector 924. That is, the defective pixel specifying process may be performed before the demosaicing process performed by the signal corrector 924 or may be performed after the demosaicing process performed by the signal corrector 924.

The brightness calculator 922 specifies a discrimination area including surrounding pixels positioned around the defective pixel specified by the defective pixel specifier 921 in the captured image CI. Then, the brightness calculator 922 performs a brightness calculation process of calculating a brightness of the corresponding discrimination area.

The defect corrector 923 performs a defect correction process of making a brightness of the defective pixel specified by the defective pixel specifier 921 approach the brightness of the discrimination area calculated by the brightness calculator 922 according to a correction degree set by the control unit 94.

Here, as the brightness of the corresponding discrimination area, an average value of component information (pixel values) of the surrounding pixels within the corresponding discrimination area in a case where the captured image CI is an image before the demosaicing process performed by the signal corrector 924. The corresponding component information (pixel value) is component information (pixel value) of any one of R, G, and B corresponding to the respective R, G, and B filter groups which constitute the color filter 541a. In this case, similarly, a brightness of the corresponding defective pixel also becomes component information (pixel value) of the corresponding defective pixel.

Further, as the brightness of the corresponding discrimination area, an average value of luminance values according to an RGB value (pixel value) or a Y signal (luminance signal) of the surrounding pixels within the corresponding discrimination area may be exemplified in a case where the captured image CI is an image after the demosaicing process performed by the signal corrector 924. In this case, similarly, a brightness of the corresponding defective pixel also becomes a luminance value according to an RGB value (pixel value) or a Y signal (luminance signal) of the corresponding defective pixel.

That is, similarly to the defective pixel specifying process, the brightness calculation process and the defect correction process may be performed before the demosaicing process performed by the signal corrector 924 or may be performed after the demosaicing process performed by the signal corrector 924.

Figure 3:
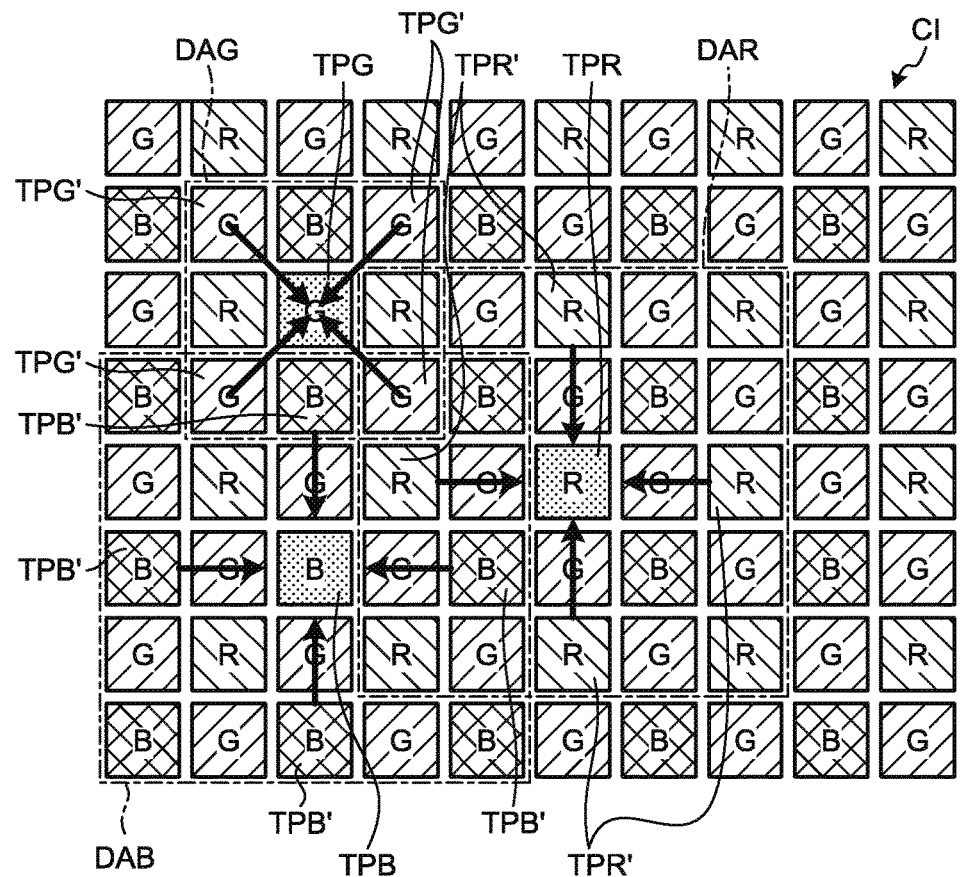
FIG. 3 is a diagram illustrating an example of a brightness calculation process and a defect correction process.

FIG. 3 is a diagram illustrating an example of the brightness calculation process and the defect correction process. In FIG. 3, the captured image CI before the demosaicing process performed by the signal corrector 924 is illustrated, and for convenience of explanation, a pixel corresponding to the R filter group in the color filter 541a is indicated by a character "R", a pixel corresponding to the G filter group is indicated by a character "G", and a pixel corresponding to the B filter group is indicated by a character "B". Further, in FIG. 3, dots are added to defective pixels TPR, TPG, and TPB specified by the defective pixel specifier 921.

For example, a case where the defective pixel TPR is a pixel corresponding to the R filter group in the color filter 541a is assumed. In this case, the brightness calculator 922 performs a brightness calculating process of calculating an average value of component information (pixel value) of R in four surrounding pixels TPR' (FIG. 3) in the vicinity of the defective pixel TPR among pixels corresponding to the R filter group, as a brightness of a discrimination area DAR (FIG. 3). The corresponding discrimination area DAR is a rectangular area including four surrounding pixels TPR' with the defective pixel TPR as the center. Then, the defect corrector 923 performs a defect correction process of making a pixel value of the defective pixel TPR approach a brightness of the corresponding discrimination area DAR as indicated by an arrow in FIG. 3 according to a correction degree set by the control unit 94.

For example, a case where the defective pixel TPG is a pixel corresponding to the G filter group in the color filter 541a is assumed. In this case, the brightness calculator 922 performs a brightness calculating process of calculating an average value of component information (pixel value) of G in four surrounding pixels TPG' (FIG. 3) in the vicinity of the defective pixel TPG among pixels corresponding to the G filter group, as a brightness of a discrimination area DAG (FIG. 3). The corresponding discrimination area DAG is a rectangular area including four surrounding pixels TPG' with the defective pixel TPG as the center. Then, the defect corrector 923 performs a defect correction process of making a pixel value of the defective pixel TPG approach a brightness of the corresponding discrimination area DAG as indicated by an arrow in FIG. 3 according to a correction degree set by the control unit 94.

In addition, for example, a case where the defective pixel TPB is a pixel corresponding to the B filter group in the color filter 541a is assumed. In this case, the brightness calculator 922 performs a brightness calculating process of calculating an average value of component information (pixel value) of B in four surrounding pixels TPB' (FIG. 3) in the vicinity of the defective pixel TPB among pixels corresponding to the B filter group, as a brightness of a discrimination area DAB (FIG. 3). The corresponding discrimination area DAB is a rectangular area including four surrounding pixels TPB' with the defective pixel TPB as the center. Then, the defect corrector 923 performs a defect correction process of making a pixel value of the defective pixel TPB approach a brightness of the corresponding discrimination area DAB as indicated by an arrow in FIG. 3 according to a correction degree set by the control unit 94.

It should be noted that in the brightness calculation process described above, the discrimination areas DAR, DAG, and DAB may be wider. That is, the numbers of surrounding pixels TPR', TPG', and TPB' are not limited to four, and other numbers of surrounding pixels TPR', TPG', and TPB' may be used. Further, in the above description, the number of surrounding pixels TPR' used in the brightness calculation process is not limited to four, and all of eight pixels corresponding to the R filter group included in the discrimination area DAR may be used. Similarly, in the above description, the number of surrounding pixels TPB' used in the brightness calculation process is not limited to four, and all of eight pixels corresponding to the B filter group included in the discrimination area DAB may be used. Further, in the brightness calculation process described above, an average value of pixel values of a plurality of surrounding pixels TPR' and the defective pixel TPR may be calculated as the brightness of the discrimination area DAR. The same applies to the brightness of each of the discrimination areas DAG and DAB.

The signal corrector 924 multiplies the image signal (RAW signal (digital signal)) by a digital gain amplifying the corresponding digital signal. Further, the signal corrector 924 performs a RAW processing such as an optical black subtraction process, a demosaicing process, or the like on the image signal (RAW signal (digital signal)) after the multiplication by the digital gain, and converts the corresponding RAW signal (image signal) into an RGB signal (image signal). In addition, the signal corrector 924 converts the corresponding RGB signal (image signal) into a luminance signal and a chrominance signal (Y, $C_B/C_R$ signal). Further, the signal corrector 924 performs, on the image signal (digital signal), a correction process such as a white balance adjustment process, gamma correction, contour enhancement, color tone correction, or the like.

The display controller 93 generates a video signal for display based on the image signal (Y, $C_B/C_R$ signal) processed by the image processor 92 according to the control by the control unit 94. Further, the display controller 93 outputs the corresponding video signal to the display device 7 through the second transmission cable 8. By doing so, the display device 7 displays the captured image CI based on the corresponding video signal.

The control unit 94 is implemented by, for example, a CPU or the like, and outputs a control signal through the first to third transmission cables 6, 8, and 10, thereby controlling an entire operation of the control device 9 in addition to controlling operations of the light source device 3, the camera head 5, and the display device 7. As illustrated in FIG. 2, the control unit 94 includes a setting unit 941.

The setting unit 941 sets a correction degree of the defect correction process. The corresponding correction degree means a degree to which the brightness of the defective pixel specified by the defective pixel specifier 921 is made to approach the brightness of the discrimination area calculated by the brightness calculator 922 in the defect correction process.

In detail, the setting unit 941 calculates a difference (absolute value (hereinafter, referred to as a brightness difference value)) between the brightness of the defective pixel specified by the defective pixel specifier 921 and the brightness of the discrimination area calculated by the brightness calculator 922. Further, in a case where a range from a lower limit value to an upper limit value of the corresponding brightness difference value is divided into a first range and a second range in which the corresponding brightness difference value is larger than that in the first range, the setting unit 941 sets a higher correction degree for a case where the corresponding brightness difference value is in the second range, in comparison to a case where the corresponding brightness difference value is in the first range.

Figure 4:
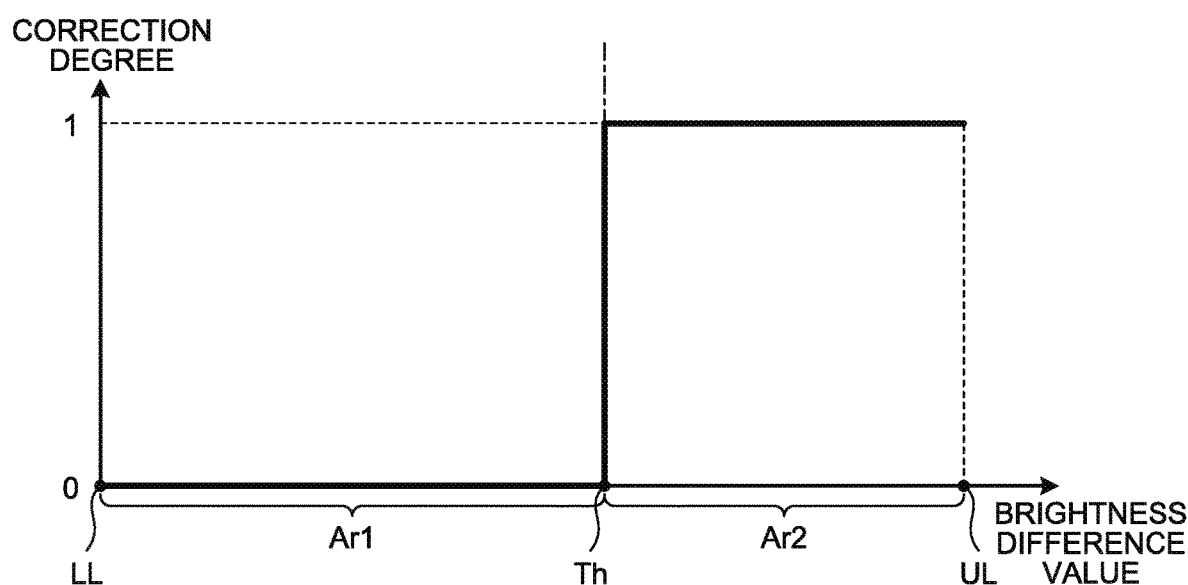
FIG. 4 is a diagram illustrating an example of a correction degree of the defect correction process.

FIG. 4 is a diagram illustrating an example of the correction degree of the defect correction process. In detail, in FIG. 4, a horizontal axis represents the brightness difference value. Further, a vertical axis represents the correction degree. In addition, Reference Sign "LL" indicates the lower limit value of the brightness difference value described above. Further, Reference Sign "UL" indicates the upper limit value of the brightness difference value described above. In addition, Reference Sign "Ar1" indicates the first range described above. Further, Reference Sign "Ar2" indicates the second range described above. In addition, Reference Sign "Th" indicates a threshold value positioned on a boundary between the first and second ranges Ar1 and Ar2. That is, the first range Ar1 is a range from equal to or more than the lower limit value LL to less than the threshold value Th. Further, the second range Ar2 is a range from equal to or more than the threshold value Th to equal to or less than the upper limit value UL.

In the present embodiment, the correction degree set by the setting unit 941 is "0", which indicates that the brightness of the defective pixel is not changed in the defect correction process, in a case where the brightness difference value is in the first range Ar1 as illustrated in FIG. 4. Meanwhile, the correction degree set by the setting unit 941 is "1", which indicates that the brightness of the defective pixel is the same as the brightness of the discrimination area in the defect correction process, in a case where the brightness difference value is in the second range Ar2.

That is, in the present embodiment, in a case where the brightness difference value is less than the threshold value Th, the defect corrector 923 does not change the brightness of the defective pixel (does not perform the defect correction process). Meanwhile, in a case where the brightness difference value is equal to or more than the threshold value Th, the defect corrector 923 makes the brightness of the defective pixel the same as the brightness of the discrimination area in the defect correction process.

The input unit 95 is implemented by an operation device such as a mouse, a keyboard, a touch panel, or the like, and receives a user operation by a user such as a doctor or the like. Further, the input unit 95 outputs, to the control unit 94, an operation signal according to the corresponding user operation.

The output unit 96 is implemented by a speaker, a printer, or the like and outputs various kinds of information.

The storage unit 97 stores a program executed by the control unit 94, information for the processing performed by the control unit 94, or the like.

Operation of Control Device

Next, an operation of the control device 9 described above will be described.

Figure 5:
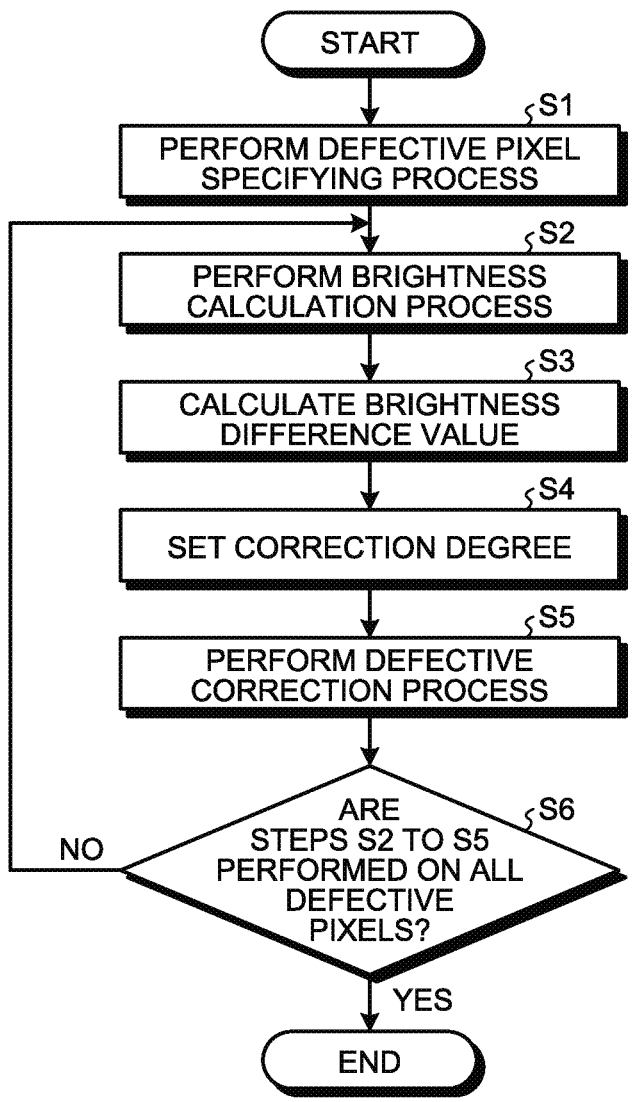
FIG. 5 is a flowchart illustrating an operation of the control device.

FIG. 5 is a flowchart illustrating an operation of the control device 9.

It should be noted that specific examples of the defective pixel specifying process, the brightness calculation process, the defect correction process performed by the image processor 92, and the correction degree setting process performed by the setting unit 941 have already been described. Therefore, hereinafter, only an order of the respective corresponding processes will be described.

First, the defective pixel specifier 921 performs the defective pixel specifying process on the captured image CI (Step S1).

After Step S1, the brightness calculator 922 focuses on one of the defective pixels (hereinafter, the corresponding pixel on which the brightness calculator 922 focuses will be referred to as a focused pixel) specified in Step S1, and specifies a discrimination area including surrounding pixels positioned around the corresponding focused pixel. Then, the brightness calculator 922 performs the brightness calculation process of calculating a brightness of the corresponding discrimination area (Step S2).

After Step S2, the setting unit 941 calculates a brightness difference value based on a brightness of the focused pixel and the brightness of the discrimination area calculated in Step S2 (Step S3).

After Step S3, the setting unit 941 sets a correction degree of the defect correction process by using a relation between the brightness difference value and the correction degree illustrated in FIG. 4 based on the brightness difference value calculated in Step S3 (Step S4).

After Step S4, the defect corrector 923 performs the defect correction process on the focused pixel according to the correction degree set in Step S4 (Step S5).

After Step S5, the control device 9 determines whether or not Steps S2 to S5 are performed on all defective pixels specified in Step S1 as focused pixels (Step S6).

In a case where it is determined that Steps S2 to S5 are not performed on all the defective pixels (Step S6: No), the control device 9 changes the focused pixel to another defective pixel and returns to Step S2.

Meanwhile, in a case where it is determined that Steps S2 to S5 are performed on all the defective pixels (Step S6: Yes), the control device 9 ends the present control flow.

According to the present embodiment described above, the following effects are exhibited.

The control device 9 according to the present embodiment sets the correction degree of the defect correction process based on the brightness difference value, and performs the defect correction process according to the corresponding correction degree. Here, the control device 9 sets the corresponding correction degree to "0" in a case where the brightness difference value is in the first range Ar1. Meanwhile, the control device 9 sets the corresponding correction degree to "1" in a case where the brightness difference value is in the second range Ar2. That is, the control device 9 does not perform the defect correction process on a defective pixel which is inconspicuous due to a high brightness of the discrimination area. Meanwhile, the control device 9 performs the defect correction process on a defective pixel which is conspicuous due to a low brightness of the discrimination area.

Therefore, the control device 9 according to the present embodiment may control whether or not to perform the defect correction process on each region (each defective pixel) of the captured image CI, thereby making it possible to efficiently suppress image quality degradation of the corresponding captured image CI.

First Modified Example of Embodiment

Figure 6:
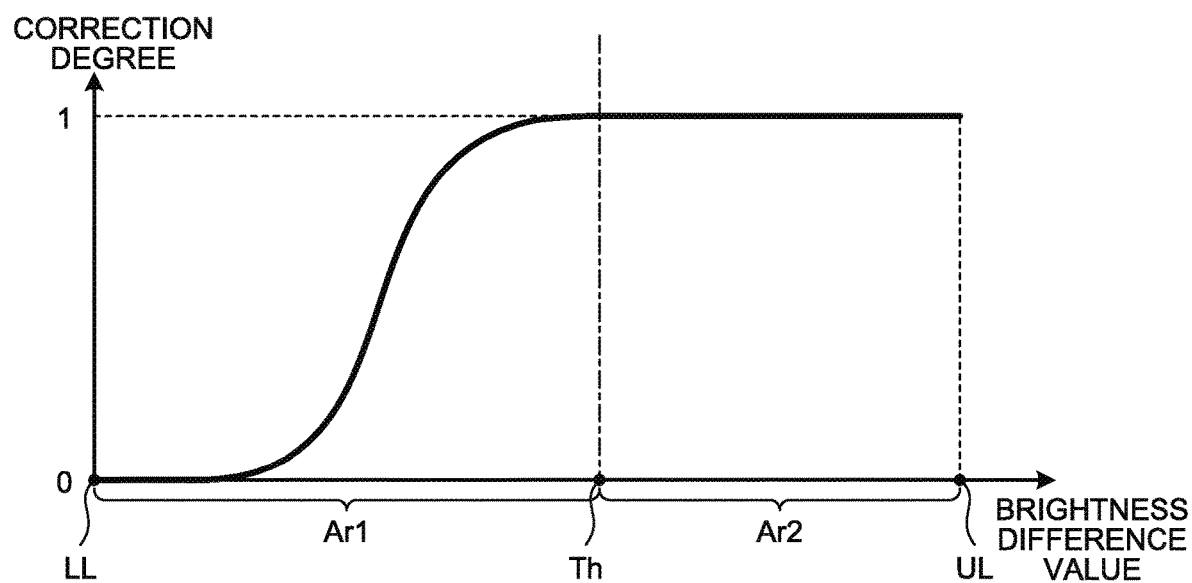
FIG. 6 is a diagram illustrating a first modified example of the embodiment.

FIG. 6 is a diagram illustrating a first modified example of the present embodiment. In detail, FIG. 6 is a diagram corresponding to FIG. 4.

In the embodiment described above, the correction degree of the defect correction process may be set as in the first modified example illustrated in FIG. 6.

In detail, in the first modified example, the correction degree set by the setting unit 941 is "0" in a case where the brightness difference value is the lower limit value LL as illustrated in FIG. 6. Further, the correction degree set by the setting unit 941 is increased from "0" to "1" as the brightness difference value is increased from the lower limit value LL to the threshold value Th. In addition, the correction degree set by the setting unit 941 is "1" in a case where the brightness difference value is equal to or more than the threshold value Th.

That is, in the first modified example, in a case where the brightness difference value is the lower limit value LL, the defect corrector 923 does not change the brightness of the defective pixel (does not perform the defect correction process). Further, as the brightness difference value is increased from the lower limit value LL to the threshold value Th, the defect corrector 923 makes the brightness of the defective pixel approach the brightness of the discrimination area in the defect correction process. In addition, in a case where the brightness difference value is equal to or more than the threshold value Th, the defect corrector 923 makes the brightness of the defective pixel the same as the brightness of the discrimination area in the defect correction process.

Even in a case where the correction degree is set as in the first modified example described above, the same effects as those of the embodiment described above are exhibited.

Second Modified Example of Embodiment

Figure 7:
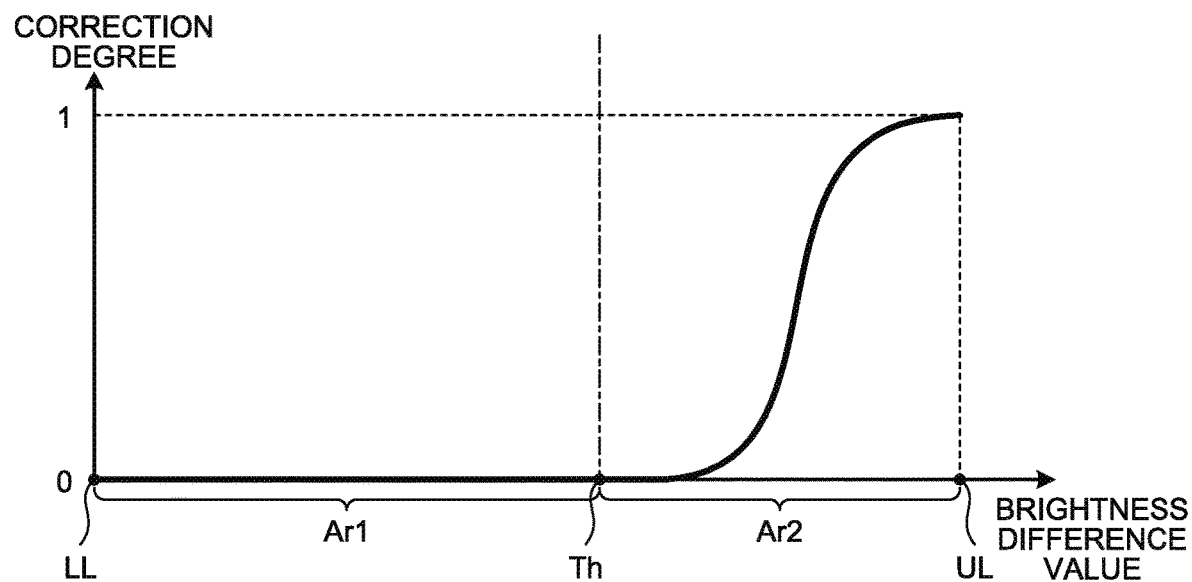
FIG. 7 is a diagram illustrating a second modified example of the embodiment.

FIG. 7 is a diagram illustrating a second modified example of the present embodiment. In detail, FIG. 7 is a diagram corresponding to FIG. 4.

In the embodiment described above, the correction degree of the defect correction process may be set as in the second modified example illustrated in FIG. 7.

In detail, in the second modified example, the correction degree set by the setting unit 941 is "0" in a case where the brightness difference value is less than the threshold value Th as illustrated in FIG. 7. Further, the correction degree set by the setting unit 941 is increased from "0" to "1" as the brightness difference value is increased from the threshold value Th to the upper limit value UL. In addition, the correction degree set by the setting unit 941 is "1" in a case where the brightness difference value is the upper limit value UL.

That is, in the second modified example, in a case where the brightness difference value is less than the threshold value Th, the defect corrector 923 does not change the brightness of the defective pixel (does not perform the defect correction process). Further, as the brightness difference value is increased from the threshold value Th to the upper limit value UL, the defect corrector 923 makes the brightness of the defective pixel approach the brightness of the discrimination area in the defect correction process. In addition, in a case where the brightness difference value is the upper limit value UL, the defect corrector 923 makes the brightness of the defective pixel the same as the brightness of the discrimination area in the defect correction process.

Even in a case where the correction degree is set as in the second modified example described above, the same effects as those of the embodiment described above are exhibited.

Third Modified Example of Embodiment

Figure 8:
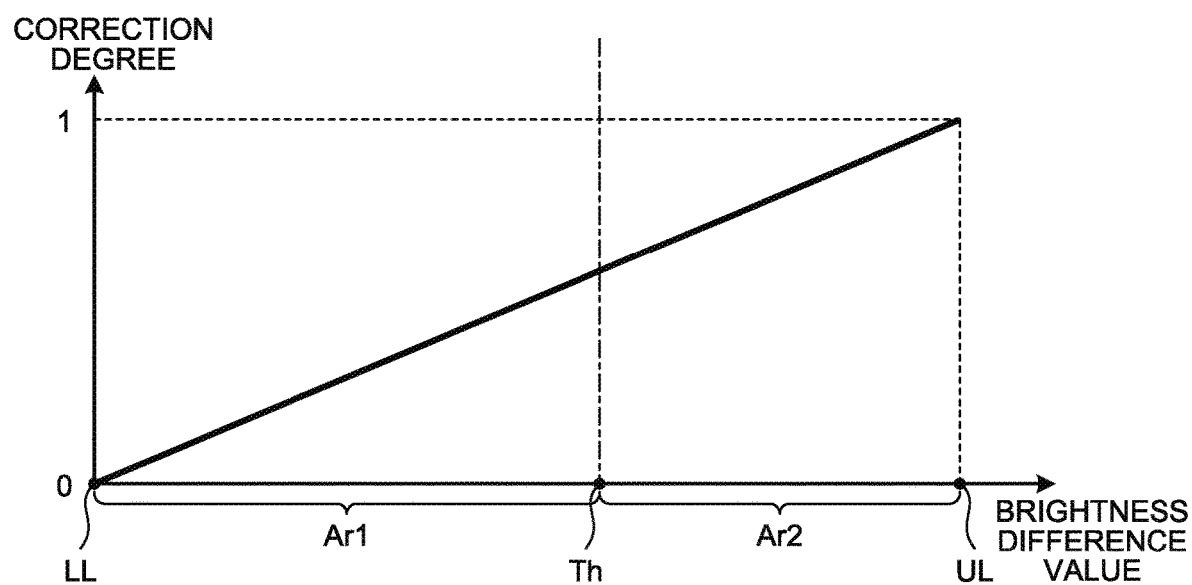
FIG. 8 is a diagram illustrating a third modified example of the embodiment.

FIG. 8 is a diagram illustrating a third modified example of the present embodiment. In detail, FIG. 8 is a diagram corresponding to FIG. 4.

In the embodiment described above, the correction degree of the defect correction process may be set as in the third modified example illustrated in FIG. 8.

In detail, in the third modified example, the correction degree set by the setting unit 941 is "0" in a case where the brightness difference value is the lower limit value LL as illustrated in FIG. 8. Further, the correction degree set by the setting unit 941 is linearly increased from "0" to "1" as the brightness difference value is increased from the lower limit value LL to the upper limit value UL. In addition, the correction degree set by the setting unit 941 is "1" in a case where the brightness difference value is the upper limit value UL.

That is, in the third modified example, in a case where the brightness difference value is the lower limit value LL, the defect corrector 923 does not change the brightness of the defective pixel (does not perform the defect correction process). Further, as the brightness difference value is increased from the lower limit value LL to the upper limit value UL, the defect corrector 923 makes the brightness of the defective pixel approach the brightness of the discrimination area in the defect correction process. In addition, in a case where the brightness difference value is the upper limit value UL, the defect corrector 923 makes the brightness of the defective pixel the same as the brightness of the discrimination area in the defect correction process.

Even in a case where the correction degree is set as in the third modified example described above, the same effects as those of the embodiment described above are exhibited.

OTHER EMBODIMENTS

Hereinabove, the embodiment has been described, but the present disclosure is not limited to the embodiment described above and the first to third modified examples of the embodiment.

In the embodiment and the first to third modified examples, as the defective pixel according to the present disclosure, a defective white spot pixel has been exemplified. However, the present disclosure is not limited thereto and the defective pixel may be a defective black spot pixel.

In the embodiment and the first to third modified examples, the color filter 541*a* is provided in the image sensor 541, but the present disclosure is not limited thereto. For example, the image sensor 541 may be implemented by a so-called monochrome sensor in which the color filter 541*a* is not provided. Further, the image sensor 541 may also be implemented by a three-plate type including an image sensor for R, an image sensor for G, and an image sensor for B.

In the embodiment and the first to third modified examples, some components of the camera head 5 or some components of the control device 9 may also be provided in, for example, the connector CN1 or CN2.

In the embodiment and the first to third modified examples, the medical image processing apparatus according to the present disclosure is mounted in the medical observation system 1 in which the insertion unit 2 is implemented by a rigid endoscope, but the present disclosure is not limited thereto. For example, the medical image processing apparatus according to the present disclosure may also be mounted in a medical observation system in which the insertion unit 2 is implemented by a flexible endoscope. Further, the medical image processing apparatus according to the present disclosure may also be mounted in a medical observation system such as an operating microscope (for example, see JP 2016-42981 A) which enlarges and observes a predetermined visual field of the inside of a subject (inside of a living body) or a surface of the subject (a surface of the living body).

The medical image processing apparatus and a medical observation system according to the present disclosure may efficiently suppress image quality degradation of a captured image caused by a defective pixel.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A medical image processing apparatus comprising:
   circuitry configured to:
   specify a defective pixel in a captured image obtained by capturing an image of a subject based on a pixel level of each individual pixel in the captured image that exceeds a predetermined threshold value, the defective pixel being specified independently from pixel levels of surrounding pixels around the defective pixel in the captured image;
   set a correction degree of a defect correction process of making a brightness of the defective pixel approach a brightness of a discrimination area including the surrounding pixels; and
   perform the detect correction process according to the correction degree,
   wherein in a case where a range from a lower limit value to an upper limit value of a difference between the brightness of the defective pixel and the brightness of the discrimination area is divided into a first range and a second range in which the difference is larger than that in the first range, the circuitry is configured to set a higher correction degree for a case where the difference is in the second range, in comparison to a case where the difference is in the first range.

2. The medical image processing apparatus according to claim 1, wherein
   the correction degree set by the circuitry is a correction degree indicating that the brightness of the defective pixel is not changed in the defect correction process in a case where the difference is in the first range, and
   the correction degree set by the circuitry is a correction degree indicating that the brightness of the defective pixel is made to be the same as the brightness of the discrimination area in the defect correction process in a case where the difference is in the second range.

3. The medical image processing apparatus according to claim 1, wherein
   the correctiondegree set by the circuitry is increased as the difference is increased in a case where the difference is in the first range, and the correction degree set by the circuitry is a correction degree indicating that the brightness of the defective pixel is made to be the same as the brightness of the discrimination area in the defect correction process in a case where the difference is in the second range.

4. The medical image processing apparatus according to claim 1, wherein the correction degree set by the circuitry is a correction degree indicating that the brightness of the defective pixel is not changed in the defect correction process in a case where the difference is in the first range, and the correction degree set by the circuitry is increased as the difference is increased in a case where the difference is in the second range.

5. The medical image processing apparatus according to claim 1, wherein the correction degree set by the circuitry is increased as the difference is increased in the range from the lower limit value to the upper limit value of the difference between the brightness of the detective pixel and the brightness of the discrimination area.

6. A medical observation system comprising:

an observation apparatus configured to generate a captured image obtained by capturing an image of a subject; and the medical image processing apparatus according to claim 1 which is connected to the observation apparatus and processes the captured image.

* * * * *